United States Patent
Yagawa

(10) Patent No.: US 7,177,995 B2
(45) Date of Patent: Feb. 13, 2007

(54) LONG TERM DATA PROTECTION SYSTEM AND METHOD

(75) Inventor: Yuichi Yagawa, San Jose, CA (US)

(73) Assignee: Hitachi, Ltd., Tokyo (JP)

(*) Notice: Subject to any disclaimer, the term of this patent is extended or adjusted under 35 U.S.C. 154(b) by 0 days.

(21) Appl. No.: 11/498,449

(22) Filed: Aug. 2, 2006

(65) Prior Publication Data

US 2007/0011501 A1    Jan. 11, 2007

Related U.S. Application Data

(62) Division of application No. 10/801,898, filed on Mar. 15, 2004, now Pat. No. 7,100,008.

(51) Int. Cl.
*G06F 12/16* (2006.01)

(52) U.S. Cl. .............................. 711/162; 711/173; 714/6

(58) Field of Classification Search ................ 711/162, 711/173; 714/6
See application file for complete search history.

(56) References Cited

U.S. PATENT DOCUMENTS

| 5,271,018 A * | 12/1993 | Chan ........................... 714/710 |
| 5,440,727 A * | 8/1995 | Bhide et al. ................ 711/117 |
| 5,778,395 A * | 7/1998 | Whiting et al. ............. 707/204 |
| 5,815,649 A * | 9/1998 | Utter et al. .................... 714/6 |
| 5,930,831 A * | 7/1999 | Marsh et al. ................ 711/173 |
| 6,192,472 B1 * | 2/2001 | Garay et al. ................ 713/165 |
| 6,367,029 B1 * | 4/2002 | Mayhead et al. ............. 714/2 |
| 6,405,315 B1 * | 6/2002 | Burns et al. ................ 713/190 |
| 6,591,376 B1 * | 7/2003 | VanRooven et al. .......... 714/36 |
| 6,654,771 B1 * | 11/2003 | Parham et al. .............. 707/204 |
| 2002/0032691 A1 * | 3/2002 | Rabii et al. ................. 707/200 |
| 2002/0194209 A1 * | 12/2002 | Bolosky et al. ............. 707/205 |
| 2003/0200207 A1 * | 10/2003 | Dickinson ...................... 707/3 |

FOREIGN PATENT DOCUMENTS

| WO | PCT WO99/38092 | * | 7/1999 |
| WO | PCT WO99/38093 | * | 7/1999 |

* cited by examiner

*Primary Examiner*—Jack A. Lane
(74) *Attorney, Agent, or Firm*—Townsend and Townsend and Crew LLP

(57) ABSTRACT

A file to be written can be partitioned into one or more partitions. Each such input partition is identified with a hash code and a group ID. Replica(s) of an input partition can be created to ensure a certain number of identical partitions. When a file is accessed, each partition that is read out can be checked for corruption. Corrupted readout partitions are then replaced with a validated replacement partition, whether the replacement partition is from a replica or from another file.

16 Claims, 9 Drawing Sheets

| File Id | Location | ----- | Hash Values | Size | |
|---|---|---|---|---|---|
| 1000 | 1.10 | ----- | 10, 13, 20, 30 | 512 | ~751 |
| 2000 | 2.15 | ----- | 15, 11, 13, 20, 40 | 512 | ~752 |
| 3000 | 3.5 | ----- | 10, 18, 13, 40 | 1024 | ~753 |
|  |  |  |  |  | |
| ----- | ----- | ----- | ----- |  | |

FIG. 4

| Hash Value | Group Id | File Id | Partition Number | |
|---|---|---|---|---|
| --- | --- | --- | --- | |
| 10 | 3 | 5600 | 9 | |
| 12 | 4 | 900 | 7 | |
| 13 | 1 | 1000 | 2 | ~ 851 |
| 13 | 1 | 1500 | 3 | ~ 852 |
| 13 | 1 | 2000 | 3 | ~ 854 |
| 13 | 2 | 3000 | 3 | ~ 853 |
| 14 | 7 | 800 | 21 | |
| 14 | 9 | 2300 | 3 | |
| 15 | 1 | 1600 | 2 | |
| 15 | 1 | 2000 | 1 | |
| --- | --- | --- | --- | |

FIG. 5

|     | 700     | 710      | 720   | 730            | 740  |     |
|-----|---------|----------|-------|----------------|------|-----|
|     | File Id | Location | ----- | Hash Values    | Size |     |
|     | 1000    | 1.10     | ----- | 10, 13, 20, 30 | 512  | 751 |
|     | 2000    | 2.15     | ----- | 15, 11, 13, 20, 40 | 512 | 752 |
|     | 3000    | 3.5      | ----- | 10, 18, 13, 40 | 1024 | 753 |
|     | R300    | 1.5      | ----- | 11             | 512  | 754 |
|     | -----   | -----    | ----- | -----          |      |     |

FIG. 4A

| Hash Value | Group Id | File Id | Partition Number |     |
|------------|----------|---------|------------------|-----|
| ---        | ---      | ---     | ---              |     |
| 11         | 1        | R300    | 1                |     |
| 11         | 1        | 2000    | 2                |     |
| 12         | 4        | 900     | 7                |     |
| 13         | 1        | 1000    | 2                | 851 |
| 13         | 1        | 1500    | 3                | 852 |
| 13         | 1        | 2000    | 3                | 854 |
| 13         | 2        | 3000    | 3                | 853 |
| 14         | 7        | 800     | 21               |     |
| 14         | 9        | 2300    | 3                |     |
| 15         | 1        | 1600    | 2                |     |
| 15         | 1        | 2000    | 1                |     |
| ---        | ----     | ---     | ---              |     |

FIG. 5A

LONG TERM DATA PROTECTION SYSTEM AND METHOD

CROSS-REFERENCES TO RELATED APPLICATIONS

This application is a divisional application of U.S. application Ser. No. 10/801,898, filed Mar. 15, 2004 now U.S. Pat. No. 7,100,008, fully incorporated by reference for all purposes.

BACKGROUND OF THE INVENTION

The present invention is generally related to storage systems and in particular to a system and method for providing reliable long term retention of data.

Events in recent times have identified the need for long-term storage of data. Businesses and data users in general have a need for archiving data for long periods of time. Enterprises are interested in long term data preservation, motivated in large part by government imposed regulations. For example, the U.S. Securities and Exchange Commission (SEC) requires exchange members, brokers, and dealers to preserve records of trading accounts until the end of the account plus 6 years, and records of all communications, such as email with their customers, must be kept for a period of not less than 6 years under the Securities Exchange Act of 1934 Rule 17a-4. The National Association of Securities Dealers Inc.(NASD) has similar regulations under Rule 3010 & 3110. See for example the SEC web site http://www.sec.gov for further detail.

Another example of an industry where long-term data retention is important is the healthcare industry. Regulations require hospitals to retain medical records for a patient's life plus 2 years under HIPAA (Health Insurance Portability and Accountability Act). See for example, the web site http://www.cms.hhs.gov/hipaa/ for further detail.

There are several key issues for long term data preservation, such as frequency of backups, the storage media, location of the data vault, and so on. One of the most important considerations is faithful data recovery after many years of storage; i.e., providing exactly the same data, as it was originally saved, to users after a long period of time has passed. Generally, users preserve (or archive) data using lower cost storage systems than were used for production data. Examples of lower cost storage systems include tape libraries, optical disk libraries, and ATA-based disk storage systems. Compare those systems with typical higher performance, higher reliability production data storage systems such as a RAID system using FC/SCSI based disks. Since archive storage systems are lower cost, their reliability is likewise lower than for a production system. Therefore, data loss can occur after a long period of time.

A conventional technique for increasing the reliability and reproducibility of long term data is to use a checksum. Each file is "analyzed" to determine a checksum that is associated with the file. For example, each byte (or bytes) of data in the file can be summed to produce a total called the checksum. The checksum is saved along with the file. Later, the file can be validated by repeating the checksum computation and comparing it with the stored checksum to determine if the file has been corrupted over time. Other similar techniques have also been used, e.g., hash codes. While these methods can detect if the file has been corrupted, they cannot undo the corruption.

Another conventional technique is to create one or more replicas of the file and save the file and its replicas on different storage devices. For example, a PCT publication International Publication No. WO 99/38093 discloses a method of content addressable information encapsulation, representation, and transfer. As understood, hash values are generated and used as the file descriptor and the file is replicated in several storage resources. The hash value is used to access these replicas uniquely. Since the replica(s) exists in other storage system(s), the file is recoverable even if the original one is detected to have been corrupted by using the hash value. However, the method has problems that the replicas require extra capacity in the storage systems. As a result, the cost of this solution is relatively expensive.

A need exists for reliable long term data retention. It is desirable to achieve this in a low-cost implementation.

SUMMARY OF THE INVENTION

In accordance with the present invention, one or partitions of an input file to be stored on a storage system are identified. A determination is made for each such input partition whether a sufficient number of identical partitions exist in the storage system. One or more replicas can be created to increase the number of identical partitions as needed. Conversely, partitions of a stored file can be read out; e.g., in response to a user request to access the file, or during a periodic check of stored files. Such readout partitions can be validated. Any detected corrupt readout partitions can be replaced with a validated replacement partition.

BRIEF DESCRIPTION OF THE DRAWINGS

Aspects, advantages and novel features of the present invention will become apparent from the following description of the invention presented in conjunction with the accompanying drawings, wherein:

FIGS. 4 and 4A are illustrative examples of the metadata shown in FIG. 1;

FIGS. 5 and 5A are illustrative examples of the partition identity information shown in FIG. 1;

DESCRIPTION OF THE SPECIFIC EMBODIMENTS

Figure 1:
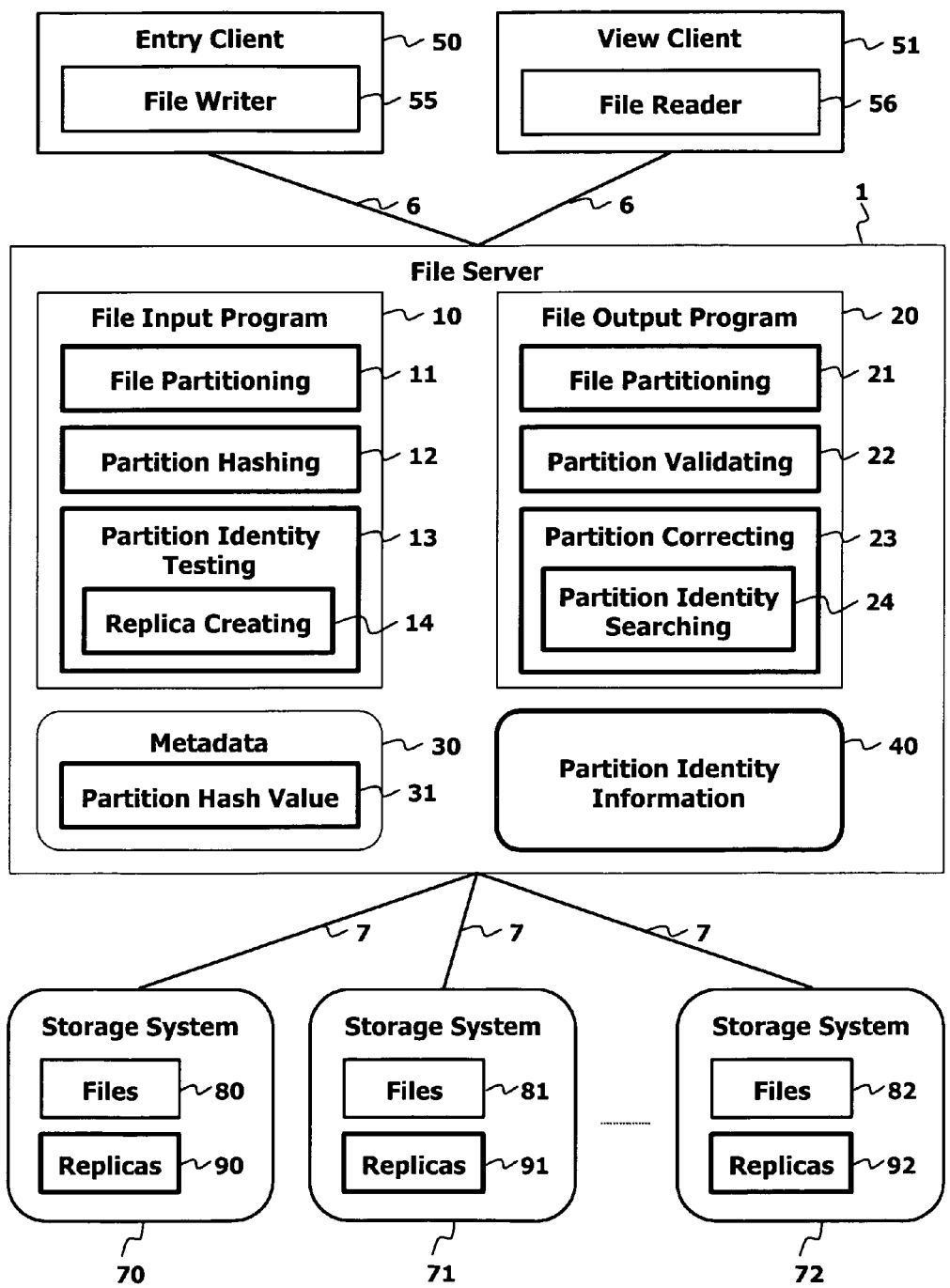
FIG. 1 is a generalized block diagram showing an illustrative embodiment of a storage system according to the present invention.

FIG. 1 shows a generalized block diagram of an illustrative embodiment according to one aspect of the invention. The figure shows a file server architecture for manipulating file-structured data objects, though it will be appreciated that the invention can be embodied in other storage architectures such as storage area networks (SAN) and Object-based Storage Devices (OSD), and can operate on data objects other than data organized as files.

In the illustrative embodiment of FIG. 1, a file server system 1 provides file services for one or more clients 50, 51. The file server can be configured for data communication with one or more storage systems 70, 71, 72 (also subsystems) in order to access files contained in the one or more file systems supported by the storage systems. Depending on the context, it may be convenient to use the term "storage system" as referring to the individual storage systems 70, 71, 72, or to use the term "storage system" to refer to the collection of storage systems as a single a storage system (or storage subsystem). It can be appreciated that additional file servers can be provided for load balancing, to increase redundancy and reliability, and so on. Typically, the storage systems are read/write-able. It can be appreciated that for a particular application of the present invention it might appropriate to use write-once storage media. It can be appreciated that certain operations discussed below may not be convenient for write-once storage media.

The client systems 50, 51 communicate with the file server 1 over suitable communication links 6. For example, the communication links can be over a TCP/IP based communication network, such as a local area network (LAN) or a wide area network (WAN). Communication between the file server 1 and the storage systems 70, 71, 72 can be provided over communication links 7 suitable for the architecture being used. For example, if the storage systems are SAN-based, then a fibre channel protocol (FCP) is appropriate. If a network attached storage (NAS) architecture is used, then a TCP/IP based protocol is appropriate. As another example, the file server 1 and the storage systems 70, 71, 72 can be configured as a single system, in which case the communication link 7 can be InfiniBand, PCI, or proprietary protocols. For the purposes of discussion, a file server architecture is assumed in which the interface between the file server 1 and the storage systems is a file interface where the storage systems 70, 71, 72 store data in units of files.

A client that performs file write operations is referred to as an "entry client." The entry client (e.g., client 50) uses a file writer functionality 55 for communicating with the file server 1 to perform a write operation. In the context of the present invention any modification to the content of a file is considered "write" operation, including file creation, updates to the file, and file deletion. In a particular embodiment of the invention, files can be characterized with the property of "fixity", which means that the files are written once and read frequently. Such files are also called "reference information" as well.

A client that performs file read operations is referred to as a "view client." The view client (e.g., client 51) uses a file reader functionality 56 to communicate with the file server 1 to access a file so that its contents can be displayed or otherwise presented to the client. Typically, any client can possess the ability to write and read files via the file server, and is thus can be an entry client or a view client, depending on the file operation being performed.

The file server 1 comprises hardware components typically found in a file server system. For example, it is understood that the file server comprises a computing or other suitable data processing component, a suitable memory component, and is likely to include some form of mass storage (e.g., local hard disk drive). A software component is understood to include an operating system (OS) and other support programs to control the computing component to communicate with clients and to communicate with the storage systems 70, 71, 72. It is understood that some file system or file systems are defined on the storage systems, and that the file server contains suitable hardware and software components to access the file systems to provide file storage services.

In accordance with the embodiment shown in FIG. 1, the file server 1 further includes a file input program component 10. The file input program component shown in the figure represents the collection of software which performs file write operations in accordance with the present invention. The file server includes a file output program component 20. The file output program component shown in the figure represents the collection of software which performs file access operations in accordance with the present invention. The file server further includes metadata 30 and partition identity information 40 which can be stored in a suitable mass storage device (e.g., a RAID device). As will become clear, these tables are components in an important aspect of the present invention. Therefore, it might be desirable that these tables be backed up to other storage devices or replicated to other standby system. For example, reliable storage for the tables can be provided by storing them in a RAID device. The metadata 30 and the partition identity information 40 are accessible by the software components comprising the file input program and the file output program.

One function of the file input program component 10 is to communicate with an entry client 50 to receive a data stream which constitutes the data corresponding to a file write request. The file input program communicates with the storage system to store the data which constitutes the file. Additional processes performed by the file input program component is discussed below. In accordance with the particular embodiment of the invention shown in FIG. 1, the file input program also updates the metadata 30 and the partition identity information 40 as needed.

The file input program component 10 comprises a file partitioning module 11. As will be explained, this module identifies the partitions (referred to as input partitions) which constitute the file. A partition hashing module 12 performs a hash operation. A partition identity testing module 13 identifies identical partitions. The partition identity testing module includes a replication module 14.

One function of the file output program component 20 is to communication with a view client 51 to access a requested file from the storage system and to provide the data to the view client. As will be explained, this includes accessing the metadata 30 and may include accessing the partition identity information 40.

The file output program component 20 comprises a file partitioning module 21. This module performs the same function as the file partitioning module 11, for the file being read. Partitions identified in the file being read out are referred to as "readout partitions." A partition validating module 22 validates each readout partition which constitutes the file being read out. A partition correcting module 23 corrects a corrupted readout partition. The partition correcting module includes a partition identity searching module 24.

Figure 2:
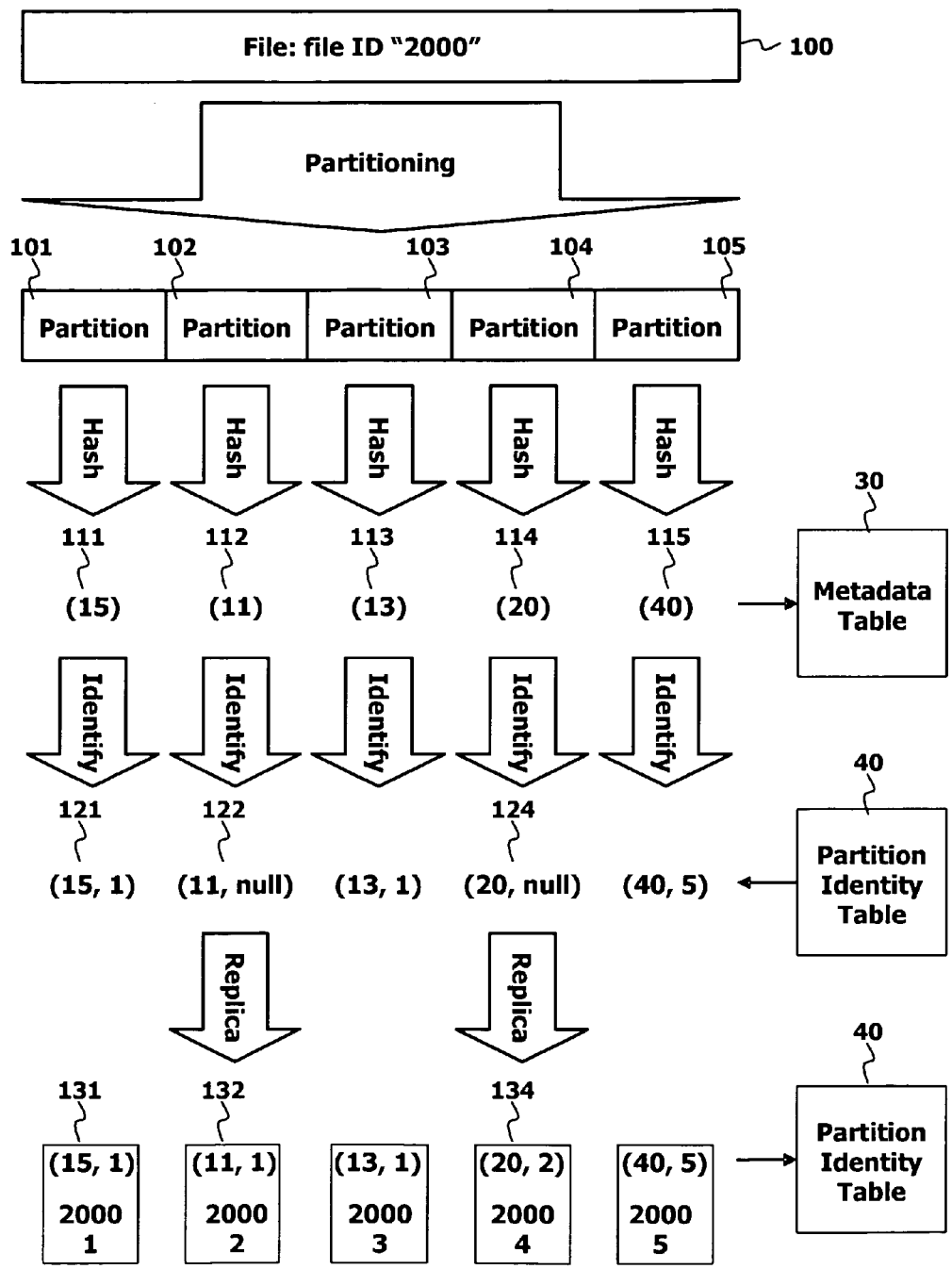
FIG. 2 is an illustration of file processing during a file write operation according to the present invention.
Figure 3:
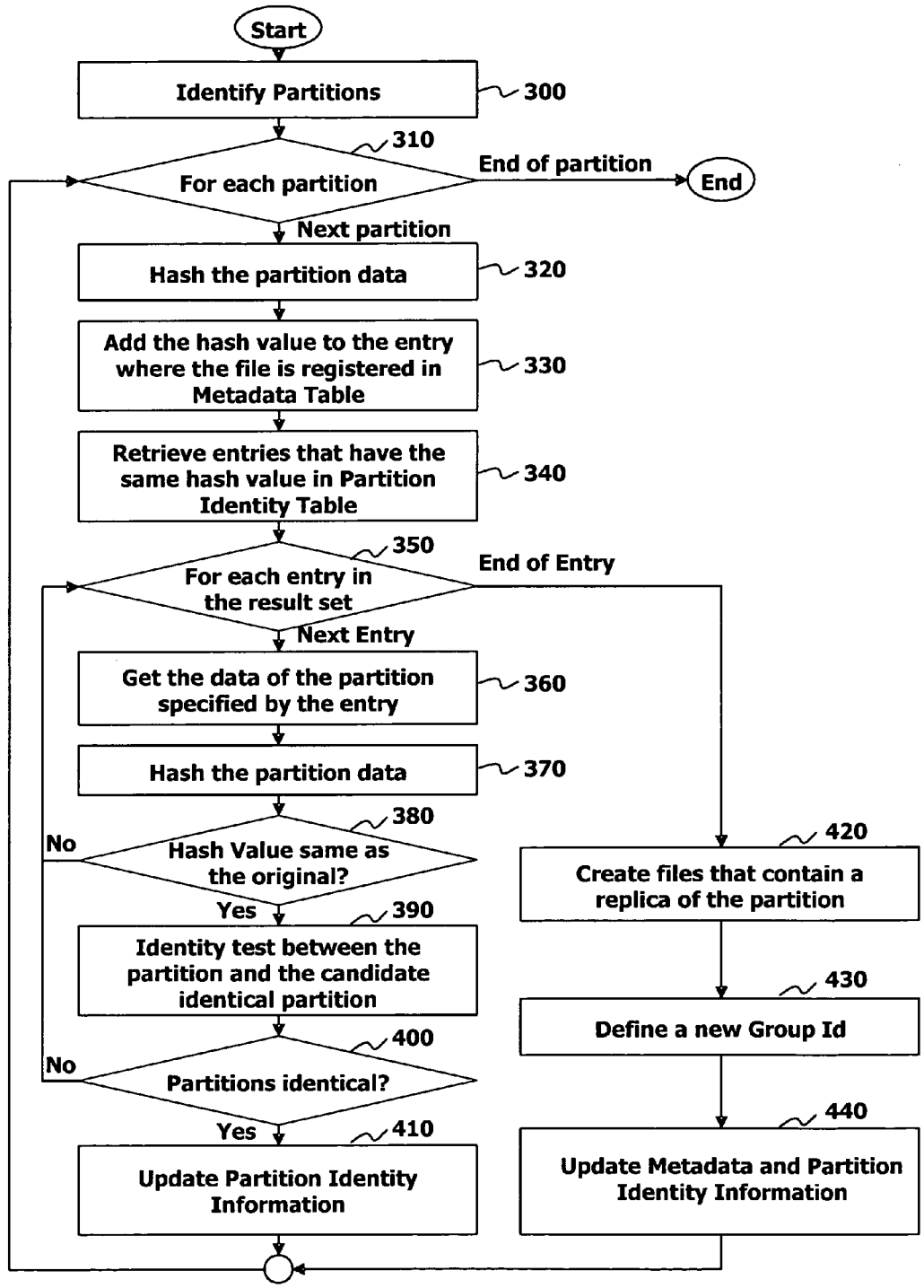
FIG. 3 is a high level flow chart highlighting aspects of the present invention in a file writing operation.

Referring now to FIGS. 2 and 3, processing a file write operation in accordance with the particular embodiment of the invention as shown in FIG. 1 will be explained. As discussed above, an entry client 50 communicates a request to the file server 1 to perform a file write operation. As part of servicing the request, the file is written to the storage system. In accordance with the present invention, the following additional operations are performed on the file. FIG. 3 is a high level flow chart highlighting the processing which occurs in the file input program 10 of FIG. 1.

In accordance with the invention, a file to written (either for the first time in the case of a new file, or as the result of modifying an existing file) to the storage system is partitioned into one or more partitions. For each constituent partition, an identical partition is either located in the storage system, or if none are found a duplicate partition is created (replica). This is repeated for each constituent partition, thus ensuring that copy of each partition of a file is to be found somewhere in the storage system. It is appreciated that a input file can be smaller that the partition size, and so in that case the file comprises a single partition. In an alternate embodiment to be discussed below, each file can be considered a partition, and again a file can comprise a single partition.

Thus, in a particular embodiment of the invention, the constituent partitions of a file are identified in a step 300, FIG. 3. FIG. 2 schematically illustrates the process. The entry client 50 provides a file 100. The partitioning step 300 results in the identification of a plurality of partitions, referred to as input partitions 101–105. A partition can be defined a fixed-sized blocks of data which comprise the file. Thus, every N bytes (or bits, or whatever unit is convenient) of the file could constitute a partition. The file would be logically divided into some number of partitions, each having N bytes ("partition size"). The last partition of a file may be smaller than the partition size. However, for convenience, it will still be referred to as a partition.

The partition size can be a predetermined size. It is possible to provide for an administrator to vary the partition size from time to time. The partition size can be programmatically varied in a periodic and automated fashion based on factors such as available storage capacity, and the so on. Partition size might be determined based on some aspect of the file; e.g., file type, file size, which specific storage system 70, 71, 72 the file is located, and so on. For example, all bitmap image files might have a partition size of 1K bits, while text files are partitioned into 512 byte blocks.

A loop 310 is performed to process each input partition 101–105 of the file 100. In accordance with the present invention, each input partition is identified in terms of its content. In the particular embodiment shown, the content of a partition can be uniquely identified by a partition ID comprising a hash code and a group ID. The hash code will be discussed now and the notion of a "group ID" will be introduced below. The hash code (hash value) is determined by applying some or all of the content of the input partition to a hash function, in a step 320. The hash function can be a one way algorithm; e.g., MD5, SHA-1, and in general can be any suitable algorithm. Thus, for example, FIG. 2 shows that input partition 101 hashes out to a value of "15", input partition 102 hashes out to a value of "11", input partition 103 hashes out to "13", input partition 104 hashes out to "20", and input partition 105 hashes out to "40". It can be appreciated that other coding algorithms can be used instead of hash coding. In addition, it may be desirable to employ different encoding techniques for different content; e.g., text files versus binary files versus bitmap files, and so on.

Returning to the processing of FIG. 3, after a hash value is determined for the input partition being processed, the hash value is associated with the file 100 as metadata, in a step 330. Referring for a moment to FIG. 4, an illustrative example of metadata 30 is shown. Conventional file systems typically store metadata for a file. Metadata refers to file attributes, location, and other information associated with the file; i.e., information that is separate from the content of the file. The metadata 30 shown in FIG. 4 is a logical representation of the information according to an embodiment of the present invention that each file might have, presented in a tabular format. The metadata might include a file ID 700, location information 710, and other information 720 (e.g., access information, file size, etc.). The metadata associated with a file includes a plurality of hash values. There is a hash value for each partition identified in the file. For example, the file 100 shown in FIG. 2 is shown in the logical representation of FIG. 4 as entry 752, with the hash values for each of the identified partitions.

As mentioned above, the partitioning step 300 can produce different sized partitions. The metadata 30 can include size information 740. Thus, for example, file entry 751 was partitioned at a size of 512 bytes (or whatever units are convenient).

Continuing with FIG. 3, the next step is to identify whether there is a partition somewhere in the storage system that is identical to the input partition being processed. In accordance with this embodiment of the present invention, this involves considering each of the partitions which constitute each file in the storage system and making a determination if the partition is the same as the input partition.

Two partitions are "identical" if the content of one partition is bit-by-bit identical to the content of the other partition. Data in a partition (referred to as "partition data") from one file can be identical to the partition data from another file. In fact, it is possible for two or more different partitions from the same file to be identical (have the same data); e.g., a bitmap file may have a long run of zeroes if the image contains a large white area (or dark area) and thus two or more partitions of such a file might consist only of zeroes. In the particular embodiment shown in FIG. 1, this aspect of the invention involves accessing the partition identity information 40.

Referring for a moment to FIG. 5, an example of the partition identity information 40 is shown. The partition identity information identifies all the identical partitions and the files containing those partitions. First, consider the partition identifier. This uniquely identifies the content of a partition. As mentioned above, the partition identifier comprises a hash code (step 310) and a group ID. Depending on the particular implementation specifics, it is likely the hash function will not guarantee a code that uniquely identifies the content of each partition. For example, if a partition size is 256 bytes, and the hash code is 8 bytes, it is clear that the 8 bytes of the hash code is insufficient to represent all the possible combinations of 256-byte partitions. Consequently, it is possible that two partitions which have content different from each other will hash out to the same hash value. To further distinguish among those partitions which have the same hash value, the "group ID" can be used. Thus, as will be explained below, those partitions which have identical content (i.e., are identical) will be identified by the same hash code value and by the same group ID value. How the group ID is determined will be explained below.

The partition identity information 40 shown in FIG. 5 is logically represented in tabular form for convenience. Partition identity information is provided for each partition of each file stored in the storage system. Each partition is associated with a partition ID which comprises a hash value 800 and a group ID 810. Each partition is further associated with a file ID 820 which identifies the file that contains the partition. This file ID relates back to the file ID 700 shown in FIG. 4. Each partition is further associated with a partition number 830. The partition number is an ordinal number which indicates the position of that partition in the file relative to the other partitions comprising the file. Thus, for example, partition entry 851 belongs to a file identified by a file ID of "1000". This particular partition has a hash value of 13 (and a group ID of 1), and is the 2 partition in the file. The grayed out entry 854 represents the addition of a new partition to the partition information, which will now be discussed.

Returning to the process steps highlighted in FIG. 3, the step of identifying whether a partition exists that is identical to the input partition being processed in the loop 310 includes retrieving entries from the partition identity information 40 that have the same hash value, in a step 340. Thus, suppose the third partition 103 of the file shown in FIG. 2 is the input partition. This partition hashes out to a hash value of "13". The partition information table is accessed to identify other partitions (if any) that have the same hash value. In this case, the partitions identified by 851–853 are the candidate partitions that will be considered in the subsequent steps.

In a loop 350, each candidate partition is subject to the following:

- step 360: The content of candidate partition is accessed. Thus, for partition 851, the file identified as "1000" would be accessed; the location can be determined by accessing the metadata 30 for file "1000". The content of the $2^{nd}$ partition of file "1000" would be read out.
- step 370: Hash the accessed candidate partition. Thus, the $2^{nd}$ partition of file "1000" would be hashed.
- step 380: Compare with the hash value of the candidate with the hash value of the input partition being processed; they should be the same. However, if they are different, then it can be concluded that the candidate partition (in this case, the $2^{nd}$ partition of file "1000") had become corrupted. In accordance with this particular embodiment of the invention, nothing more is done for this partition; it is skipped over and processing proceeds to the top of the loop 350 to process the next candidate partition(s), in this case partitions 852 and 853. Alternatively, additional information can be provided in the partition identity information 40 to indicate that this candidate partition had been determined to be corrupted. Still another alternative is to mark this candidate partition for a subsequent correction step. Yet another alternative is to attempt to make a correction upon discovering the error. An example of a correction step is discussed below in connection with FIG. 7.
- step 390: If at step 380, the hash values match, then an identity test is performed. In accordance with this particular embodiment, the test comprises comparing the content of the input partition being processed with the accessed candidate partition to determine if the two partitions are bit-for-bit identical; i.e. identical partitions.
- step 400: If the candidate partition and the input partition being processed are determined to be identical, then the partition identity information 40 is updated (in a step 410) to include the input partition. The update information includes the hash value of the input partition, the group ID of the matching candidate partition, the file ID of the file to which the input partition belongs, and the relative position of the input partition. In this case, the input partition is determined to be identical, and so a new entry 854 is added to the partition identity information 40. The hash value is "13" and the group ID is that of the matching candidate partition, namely, "1". The file ID and partition number are also recorded; in this case, the input partition is from a file identified as "2000" and is the $3^{rd}$ partition in the file (see FIG. 2). Continuing with FIG. 3, processing then proceeds to the top of the loop 310 wherein the next input partition in the input file 100 is processed.
- step 400: If the candidate partition and the input partition being processed are not identical, then processing returns to the top of the loop 350 to process the next candidate partition (in this case, the next partition is 852).

If none of the candidate partitions from the loop 350 are identical to the input partition being processed, then processing proceeds to step 420. At this point, it can be concluded that none of the files in the storage system comprise a partition that is identical to the input partition. In step 420, one or more files are created each of which comprises the content of the input partition. Such files are referred to as "replicas" or "replica files". Replica files are distinguished from "user files", the latter being files created by clients 50, 51, while the former are internally created according to the present invention. By creating at least one replica of the input partition when an identical partition does not exist among the non-replica files stored in the storage system, a duplicate (i.e., identical) partition of the input partition is guaranteed to exist somewhere in the storage system. In practice, it is probably preferable to create more than one replica, in order to assure a certain level of retention reliability. The actual number or replicas can be a predetermined value, it can be determined by a system administrator and thus can be changed from time to time, it can be determined algorithmically in an automated basis, and so on. In practice, it is probably preferable to store the replicas throughout the storage system. Thus, for example, the configuration shown in FIG. 1 shows a plurality of storage systems 70, 71, 72. If the file containing the input partition is stored in storage system 70, for example, then it might be preferable to store one or more replicas among the storage systems 71, 72 to reduce the likelihood of lost or corrupted data.

It is worth noting at this point that "partitions" can exist in files as blocks of data (equal to the partition size). The files can be user-created files, or files created through interaction with a user (user-related files). For example, the component files of a database system are not directly created by a user, but are created to support the database which accessed by a user. Files can be replicas of partitions which exist in user-related files. Thus, the notion of referencing a partition, accessing a partition, or otherwise manipulating a partition can involve first accessing a file and then reading out the data that comprises the partition of interest. Alternatively, reference to a partition can simply refer to the information contained in the metadata 30 or the partition identity information 40.

Continuing with the discussion of FIG. 3, in a step 430, a new group ID is created when a replica is produced. Since it is determined at this point that the input partition being processed has no identical partition in any of the files stored in the storage system (not counting the replicas that were just created), a new group ID is created to identify the new unique partition in the system. In combination with the hash value of the input partition, the resulting new partition ID uniquely identifies the content of the input partition. Allocation of a group ID can be implemented, for example, by associating a counter with each hash value. Each counter can be initialized to zero. When a new group ID is needed for a given hash value, the counter corresponding to that hash value can be incremented to produce the new ID. The next time another new group ID is needed for that hash value, the counter associated with that hash value can be incremented again to produce the next ID. Of course, it can be appreciated from this description that some other ID-generating mechanism can be implemented.

In a step 440, the metadata 30 is updated to reflect each of the newly created replicas. Similarly, the partition identity information 40 is updated to include information which identifies the input partition being processed and which identifies each of the newly created replica(s). Processing can the repeat at the top of the loop 310 with the next input partition, until of the input partitions comprising the file have been processed. In FIG. 2, the loop 310 will be executed five times, once for each partition 101–105.

To illustrate to the foregoing steps, consider FIG. 2. The figure illustrates the situation where partition 102 does not have an identical partition in the system. Consequently, the processing of loop 350 will not yield a partition ID of an identical partition, since none exists. The partition ID for the input partition 102 at this point is represented in FIG. 2 as (11, NULL), where "11" is the hash code for partition 102 and the NULL indicates there are not identical partitions. The replication step 420 is then performed to create one or more replicas. A new group ID is created per step 430. In the case of partition 102, for example, no other partitions in the system hashed out to a value of "11". Therefore, the group ID value can be "1", to indicate that it is the first partition having a hash value of "11". In step 440, the metadata 30 and the partition identity information 40 are updated to include the information for partition 102 and for the one or more replicas.

FIGS. 4A and 5A represent the updates made to the metadata 30 and to the partition identity information 40. Some additional points are worth noting. A naming convention can be adopted to identify the replicas. As the embodiment in FIG. 4A shows, one such convention can be the use of special file ID. Here, the replica of the partition 102 is identified as "R300", the "R" indicating that the file is a replica of a partition. In this particular embodiment of the invention, each replica contains the partition data for a single partition. In another embodiment of the invention, a replica file can store more than one partition, which may or may not be a less convenient embodiment.

Referring back to step 410, a variation of the disclosed embodiment will now be discussed. Step 410 is reached if an existing partition that is identical to the input partition being processed. The partition identity information is updated to include information associated with the input partition. In addition, the partition identity information can be searched to if the identical partitions comprise partitions from one or more user files and partitions that are replica files. In such a case, since identical partitions exist in one or more user files, then any replicas would be redundant. Therefore, it may be desirable to delete one or more of the replica files in order to reduce the storage space consumed by the replicas. It is noted that this can be performed by a separate process.

A further variation of step 410 is to determine from the partition identity information the number of identical partitions that match the input partition being processed, including partitions that belong to user files and partitions that are replicas. In one variation, the number of identical partitions can be maintained at some predetermined value so that in step 410 one or more replicas are created (or deleted) to maintain the number of identical partitions at a constant value. If a file is deleted from the storage system, it might be desirable to determine for each partition in the file to be deleted, whether to create one or more replicas. It is noted that still another variation of step 410 is that the determination be performed by a separate process. In general, it can be appreciated the steps disclosed the various figures can be suitably partitioned into a number of separate processes using shared memory or other similar data sharing mechanism to pass information as needed.

In yet another variation, a "buffer zone" can be defined by a first predetermined level and a second predetermined level. Thus, if it is determined that the number of identical partitions for a given partition ID (hash code, group ID), exceeds the first predetermined level, then any replicas of that partition can be deleted until the number of identical partitions fall below the second predetermined level (or until all the replicas are deleted, whichever occurs first). This operation can be performed in step 410, but does not have to be performed in step 410. For example, this can be performed by a separate process. The first and second predetermined levels can be the same level, or different levels.

A similar buffer zone can be defined for creating replicas. Thus, if the number of identical partitions for a given partition ID falls below a third predetermined level, then enough replicas can be created to so that the number of identical partitions rises above a fourth predetermined level. The third and fourth predetermined levels can be the same level, or different levels.

In accordance with the foregoing embodiment, the processing shown in FIGS. 1 and 3 is initiated when a user requests that a file be stored on the storage system. It can be appreciated that the process of FIG. 3 can be performed on files which have already been stored on the storage systems. Thus, a loop can be provided that, for each file, performs the processing of FIG. 3.

Figure 6:
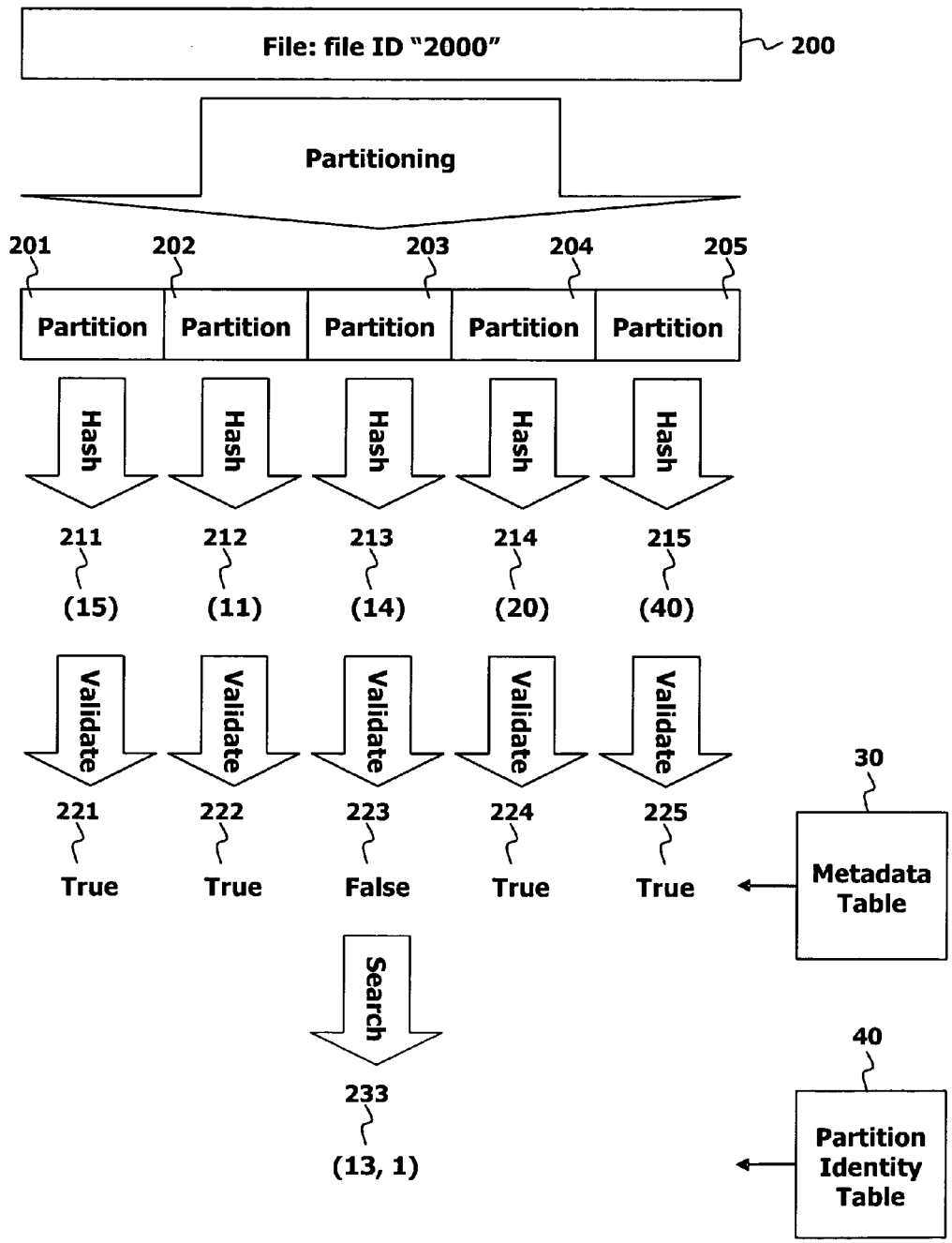
FIG. 6 is an illustration of file processing during a file read operation according to the present invention.
Figure 7:
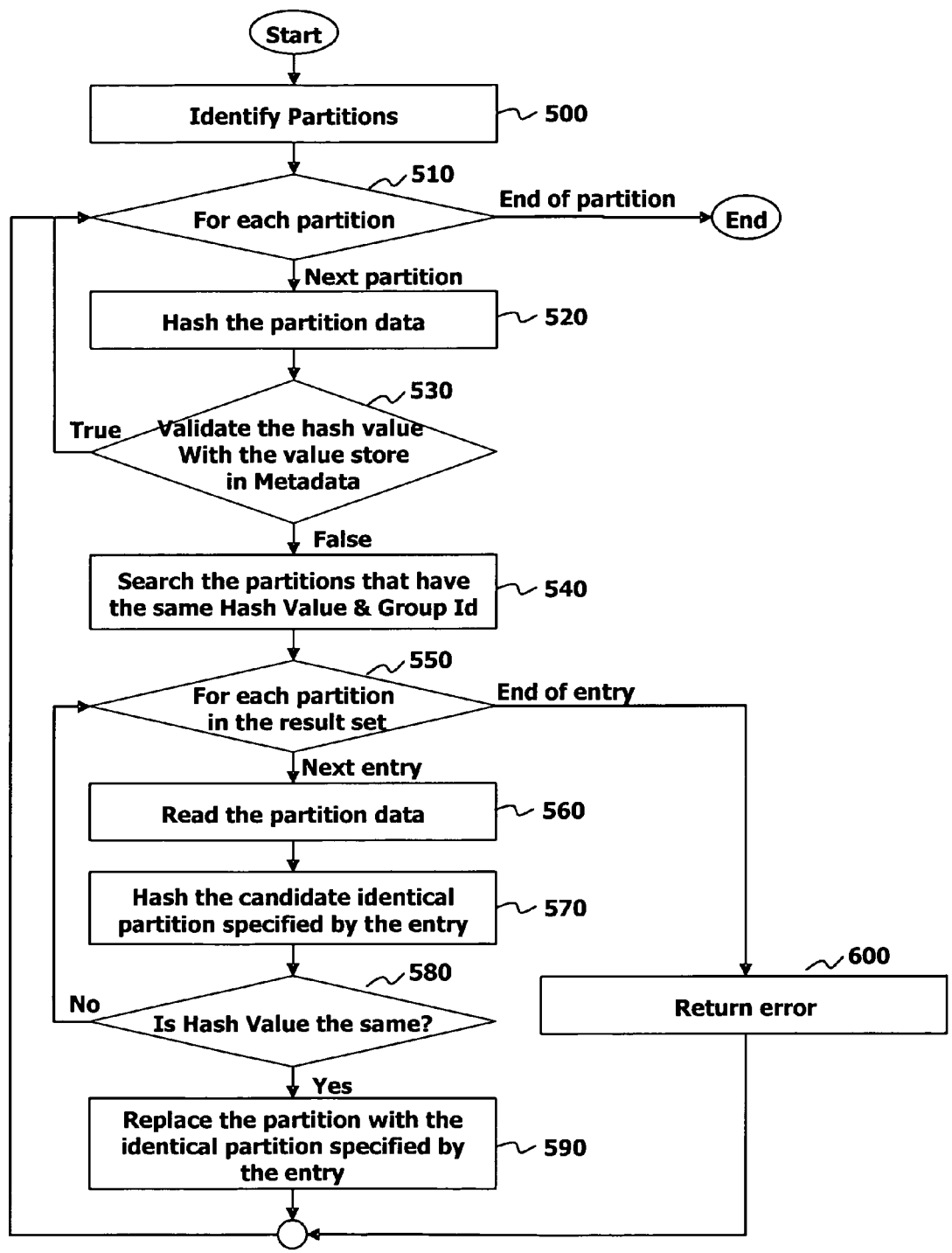
FIG. 7 is a high level flow chart highlighting aspects of the present invention in a file reading operation.

Referring now to FIGS. 6 and 7, processing a file read operation in accordance with the particular embodiment of the invention as shown in FIG. 1 will be explained. As discussed above, a view client 51 communicates a request to the file server 1 to perform a file read operation. As part of servicing the request, the file is accessed from to the storage system and delivered to the view client. In accordance with the present invention, the following additional operations are performed on the file. FIG. 7 is a high level flow chart highlighting the processing which occurs in the file output program 20 shown in FIG. 1. It will be apparent from the description that follows which steps can be performed by the modules which comprise the file output program.

It is noted here that in this particular explanation, the processing of FIG. 7 is performed in the context of a read operation. One of ordinary skill can appreciate, however, that the processing of FIG. 7 can be initiated independently of a read operation. The activity shown in FIG. 7 relates to detecting a corrupted file and repairing the detected corruption(s). It can be appreciated that such activity can be initiated other than by a user accessing the file to be read. For example, a system administrator can issue a command to the system to verify and repair files stored on the storage system, performed as part of a maintenance operation of stored files which are active or on archived files. An automated process can periodically perform the check, and so on.

In accordance with the invention, each constituent partition of a file is accessed. For each partition, a determination is made whether the partition is corrupted. If a partition is corrupted, then an attempt is made to find an identical partition that is not corrupted. If such an identical partition is found, then the data in the file of the corrupted partition is replaced with the data from the un-corrupted identical partition. This is repeated for each partition that constitutes the file.

Referring to FIG. 7 for a particular embodiment of this process, in a step 500, each partition comprising the file is accessed. FIG. 6 schematically illustrates this process with the file 200. The partitioning step 500 produces a plurality of constituent partitions, 201–205, referred to as "readout partitions." Each readout partition is processed as follows in a loop 510:

In a step 520, the hash algorithm used on the partition when the file was written is applied to the first readout partition 201 to produce a hash value. For example, the example in FIG. 6 shows that readout partition 201 hashes out to a hash value (211) of "15". The readout partition 202 has a hash value (212) of "11", the readout partition 203 has a hash value (213) of "14", and so on.

The hash value produced in step 520 is then compared (in a step 530) to the value for the readout partition that was produced when the file was written. This value is obtained from the metadata 30. Thus, the $i^{th}$ readout partition for a file will have a corresponding hash value in the metadata, namely, it will be the $i^{th}$ value in the metadata for that file. If the computed value matches the stored value, then the assumption is made that the readout partition being processed has not been corrupted, and is valid. Processing then continues with the loop 510 to process the next readout partition 202.

If the computer value does not match the value stored in the metadata 30, then a search is performed, in a step 540, for an identical partition(s). This includes consulting the partition identification information to identify the list of partitions ("identical partitions") that are identical to the readout partition being processed. Thus, referring to FIG. 6, an example of a corrupted partition is readout partition 203, which has a hash value (213) of "14"; in other words, the $3^{rd}$ partition of file with file ID "2000" has a hash value of "14". Referring to the metadata 30 shown in FIG. 4A, the $3^{rd}$ hash value for file with file ID "2000" is "13". Since "14" is not the same as "13", it is determined that the $3^{rd}$ partition for this file is corrupted.

Thus, for readout partition 203, the partition identification information 40 shown in FIG. 5A is consulted. The partition identification information for readout partition 203 is identified based on the partition's file ID and its ordinal position in the file. Here, the partition is the $3^{rd}$ partition in the file (file ID "2000"). This corresponds to partition identification information 851 shown in FIG. 5A. From this information, it can be determined that the readout partition being processed (i.e., partition 203) has a partition ID of (13, 1). Thus, in accordance with step 540, every partition whose partition ID is (13, 1) will be considered in a loop 550. In the example shown in FIG. 5A, file (file ID "1000") contains a partition (the $2^{nd}$ partition) that was identified as being identical to the readout partition 203.

It is worth noting at this point that the use of replica files ensures that each partition has a copy in the system. Whether that copy is valid is another matter; however, this aspect of the invention ensures the a partition has at least one identical partition in the system. For example, the partition identification information of FIG. 5A shows that the only partition that is identical to the second partition in file (file ID "2000") is the partition stored in the replica file (file ID "R300").

Continuing, in a step 560, each such "candidate" partition is read out from the storage system. This involves accessing the file in which the candidate partition belongs. The hash algorithm that was initially applied to the candidate partition when its corresponding file was written to the storage system is applied to the candidate partition to produce a hash value, in a step 570. The hash value is compared (in a step 580) against the value stored in the metadata 30 corresponding to the candidate partition. If a match is not found, then processing continues with loop 550 to consider the next candidate partition. If no more candidate partitions are found, then in a step 600 an error condition can be reported to a user or logged for review at a later time. The error condition indicates that the file has been corrupted.

If a match has been found, then the candidate partition is deemed to be validated. In a step 590, the data comprising the readout partition being processed, which is corrupted, is replaced by the data comprising the validated candidate partition. This operation is performed in the file output program 20 (FIG. 1) using the file I/O utilities for modifying files in the supported file system. For example, the partition correcting module 23 can perform this aspect of the invention. Processing then returns to loop 510 to process the next readout partition.

The foregoing described embodiment of the present invention is well suited for existing storage system architectures. In the foregoing described embodiment, the constituent partitions of a file are not physically stored, except for the replica files. The partitions of a file are logical partitions. If a partition is 1024 bytes in size, then the act of "identifying" the $n^{th}$ partition may simply involve reading blocks of 1024 bytes of data and retaining the $n^{th}$ block. The hash algorithm can then be applied to that block of data. The next block is accessed simply by reading the next 1024 bytes of data.

It can be appreciated, however, that a storage system can be configured to store files in units of partitions. Such a storage architecture might provide improved performance over legacy systems by being optimized for accessing partitions. Depending on the implementation, one of ordinary skill will realize that modifications are likely needed for the information comprising the metadata 830 and the information comprising the partition identity information 840. A well known example of such a storage system is object based storage. SNIA (Storage Network Industry Association) has been working for OSD (Object Storage Devices) to standardize object based storage. In this case, the partition may be called an "object."

Figure 8:
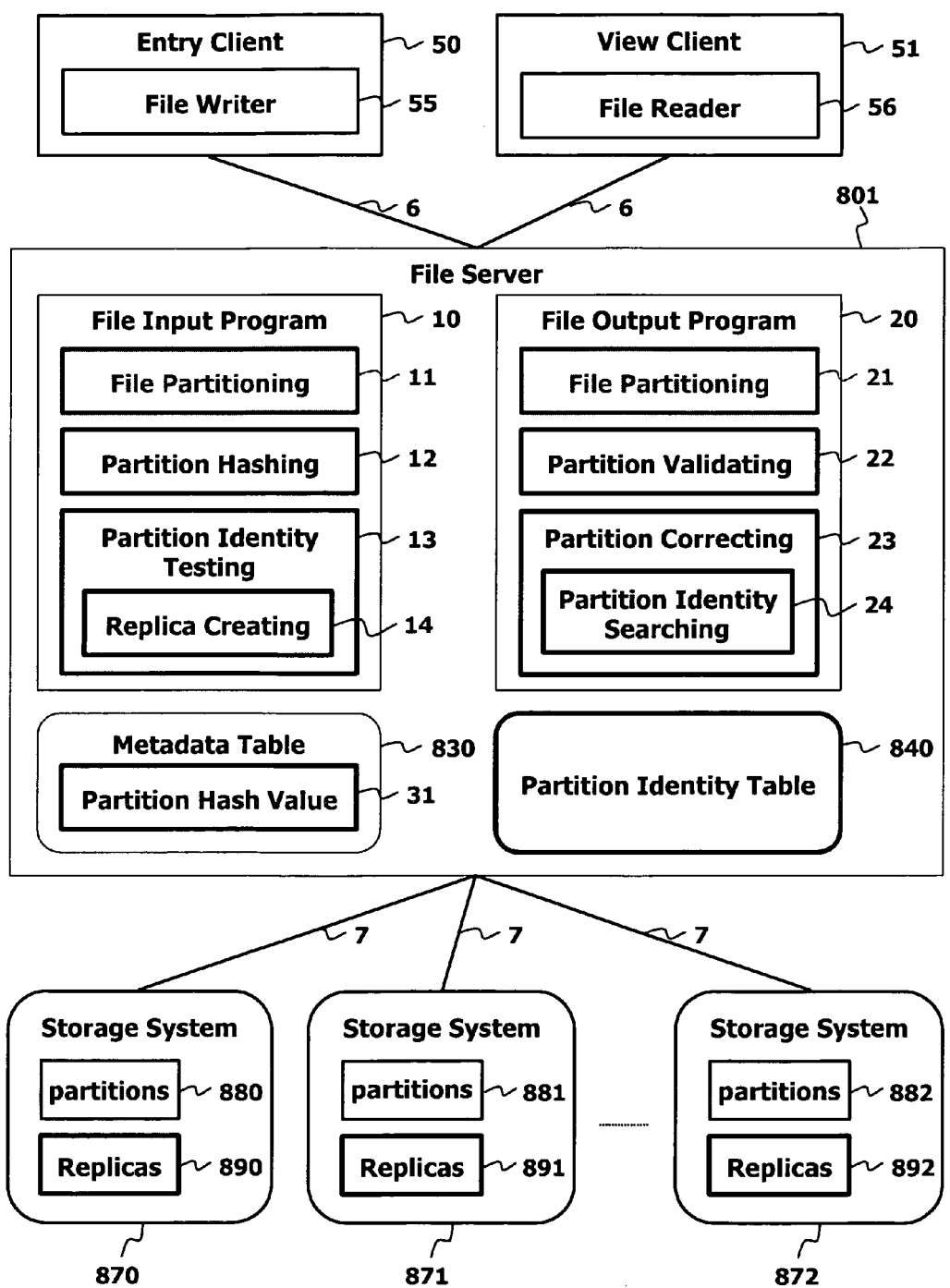
FIG. 8 is a generalized block diagram showing an alternative embodiment of the present invention.

FIG. 8 is an illustrative example of an embodiment of this aspect of the invention. A primary difference from the system shown in FIG. 1 is the presence of storage systems 870, 871, and 872. The storage systems are shown storing information in units of partitions 880, 881, and 882, respectively, as compared to storage systems 70, 71, 72 of FIG. 1 which store information in units of files 80, 81, 82. Likewise, partition replicas 890, 891, 892 would be different from the replica files 90, 91, 92 of FIG. 1.

A file server 801 might have access to additional functionality provided by the storage systems 870, 871, 872. For example, the file server might have Object Relocation functionality to relocate or arrange partitions among the storage systems based on a predefined user's policy. If the user wants to increase the redundancy of the whole system, an attempt can be made to relocate the partitions of a file to different storage systems.

The components of the file server 801 according to this embodiment of the invention might not require the file partitioning module 11 in the file input program 10 or the file partitioning module 21 in the file output program 20. The reason is that the partitioning function is provided by the storage systems 870, 871, 872. However, it my be desirable to partition the files using a partition size that is different than what is provided by the storage systems, in which case the partitioning modules 11, 21 might be needed. The modules are shown in gray outline to indicate they may or may not be needed components.

Figure 9:
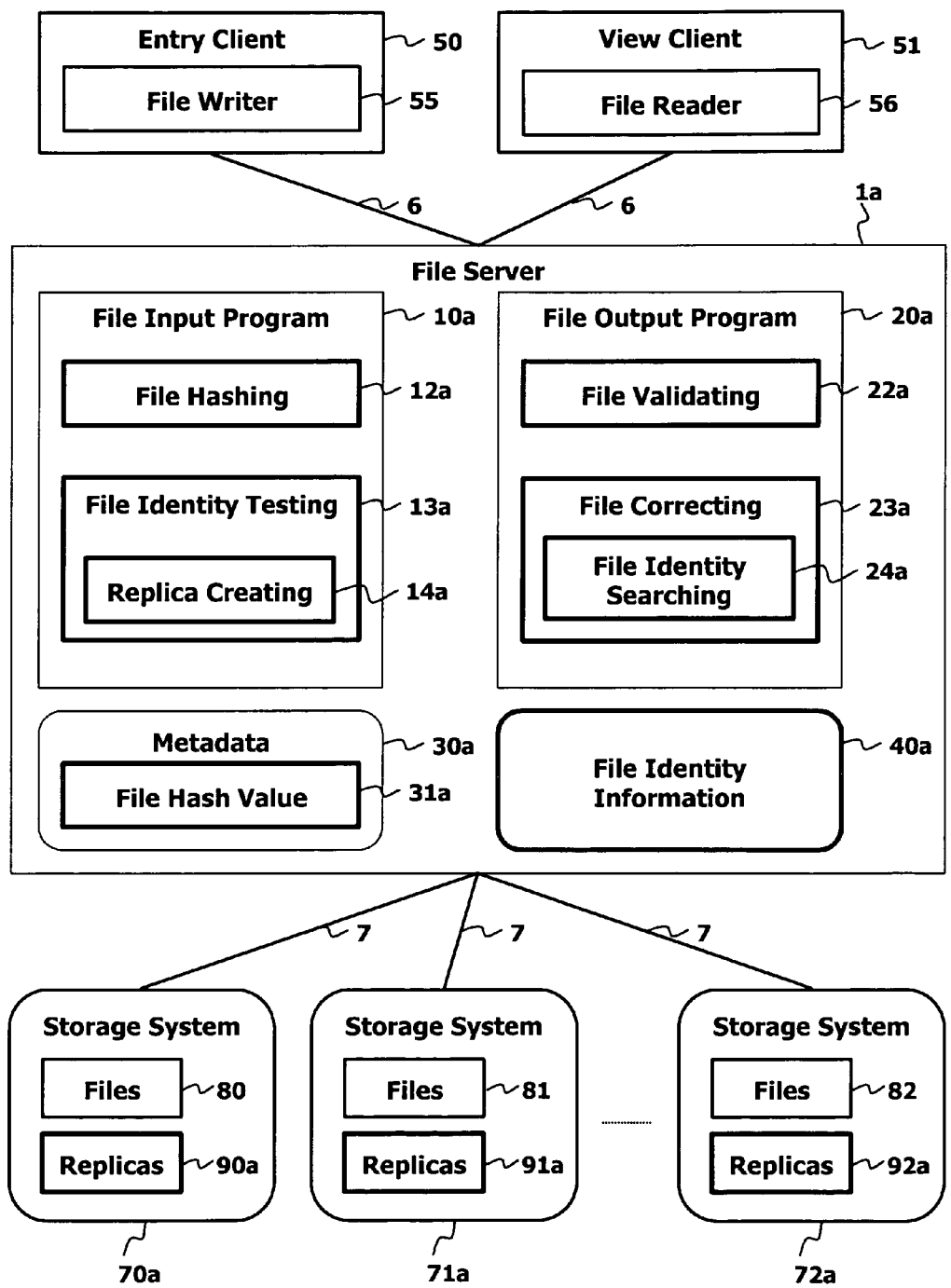
FIG. 9 is a generalized block diagram showing yet another alternative embodiment of the present invention.

Referring to FIG. 9, a discussion of an alternate embodiment of the present invention will now follow. The system configuration shown here is similar to the configuration shown in FIG. 1. Users 50, 51 access a file server 1a via suitable communication links 6. Storage systems 70a, 71a, 72a provide data storage capability for the users. Suitable data paths 7 provide a data link between the file server and the storage systems.

The file server 1a includes a file input program 10a and a file output program 20a. The operations performed by the modules which constitute the file input program and the file output program are similar to their counterparts shown in FIG. 1. In this particular embodiment of the invention, there is no partitioning of an input file that is to be written to the storage system. Likewise, there is no accessing of partitions of a file that is being read out of the storage system.

Instead of multiple constituent partitions of a file, the entire file is treated as a single large partition. Consequently, there is no partitioning module; however, the other modules comprising the file input program 10a and the file output program 20a operate in a manner similar to the process flows shown in FIGS. 3 and 7. Thus, a file hashing module 12a applies a hash function to the entire contents of a input file. Similarly, a file validating module 22a includes applying the hash function to the entire contents of the file. It can be appreciated that the hash function (or any suitable algorithm for generating a content-based code) can be applied to a portion of the file (e.g., every other byte). This particular embodiment of the present invention simply points out that partitioning of the file is not being performed.

For an input file, a file identity module 13a identifies identical files rather than identical partitions. Replicas are created by a module 14a. Replicas therefore are copies of the file. Thus, the replicas 90a, 91a, 92a stored in the storage systems 70a, 71a, 72a are copies of files. For reading out a file, a correction module 23a repairs a file by looking (via module 24a) for a identical validated files. To complete the discussion of FIG. 9, the metadata 30a requires only a single hash value for each file, namely, the hash value of the file. The partition identity information 40 shown in FIG. 1 is replaced with file identity information 40a, which provides the same kind of information as the partition identity information absent the partition number 830 component.

The present invention is particularly useful in any application area that requires long term data preservation, which also requires data protection for long period automatically. Although the foregoing embodiments of the present invention were described with respect to files as the unit of data, it can be appreciated that units of data other than files can be processed. Information can be stored in many forms, depending on specific requirements of the user. A sampling of applications include:

Digital Imaging, where the historical value of data is very important.

Email Archiving, where the same message and the same attachment files are distributed many users, but archive them effectively with efficient disk spaces.

Content/Document Archiving, where version-up are repeated and as a result the same data parts are contained.

Medical Imaging, where data must be accurate for long period.

Desktop Archiving, where data on all desktops in an office are archived, and usually most of the data are the same, since users use the same environment usually in the office.

What is claimed is:

1. A method for accessing a storage system comprising:
   accessing a first read-out partition of a data object, the first read-out partition comprising at least a portion of content comprising the data object;
   if content in the first read-out partition is corrupted, then:
      accessing the storage system to find a replacement partition from among one or more candidate partitions, including determining if a candidate partition is corrupted or not, the replacement partition being a candidate partition that is not corrupted; and
      replacing content in the data object that constitutes the first read-out partition with content of the replacement partition; and
   repeating the foregoing with a second read-out partition of the data object.

2. The method of claim 1 wherein each partition is associated with a partition ID, wherein if two partitions comprise identical content, then the two partitions have the same partition ID, wherein the read-out partition is associated with a first partition ID and the one or more candidate partitions each is associated with the first partition ID.

3. The method of claim 2 wherein the partition ID comprises a hash code and a group ID, wherein the hash code is based on content of a partition, wherein if the two partitions have the same hash code but their respective content is different from each other, then the two partitions each have a different group ID, wherein if the two partitions comprise identical content, then the two partitions have the same group ID.

4. The method of claim 1 wherein if a replacement partition cannot be found for the first read-out partition, then indicating an error condition.

5. The method of claim 1 further comprising receiving a data access request, the data access request including information indicative of the data object.

6. The method of claim 1 wherein the data object is a file.

7. A method for accessing data in a storage system comprising:
   identifying a first data object;
   obtaining a first partition of the first data object from the storage system;
   performing a computation using data comprising the first data object to produce a first computed value;
   obtaining partition identification information relating to the first partition, the partition identification information including a first previously computed value; and
   if the first computed value does not match the first previously computed value, then:
      obtaining a first candidate partition from the storage system;
      performing a computation using data comprising the first candidate partition to produce a second computed value;
      obtaining partition identification information relating to the first candidate partition, the partition identification information including a second previously computed value;
      if the second computed value does not match the second previously computed value, then repeating with a second candidate partition; and
      if the second computed value does match the second previously computed value, then replacing the data comprising the first partition of the first data object with the data comprising the first candidate partition.

8. The method of claim 7 wherein identifying a first data object is a step of receiving a read request for the first data object.

9. The method of claim 7 wherein if the first computed value does match the first previously computed value, then repeating with a second partition of the first data object.

10. The method of claim 7 wherein the first data object is a file.

11. The method of claim 7 wherein steps comprising the method are repeated for a second data object.

12. A data storage system comprising:
  a storage subsystem; and
  a data processing subsystem in data communication with the storage subsystem to store data to the storage subsystem and to access data stored on the storage subsystem,
  the data processing subsystem configured to:
    access a first file stored on the storage subsystem, wherein the first file comprises data, the data being logically grouped into one or more accessed partitions;
    determine, for each accessed partition, whether the accessed partition is corrupt, referred to as a corrupt partition;
    determine, for each corrupt partition, whether there is a replacement partition on the storage system, the replacement partition being identical to the accessed partition at a time when the accessed partition was not corrupt; and
    modify the first file to replace each of its corrupt partitions with a replacement partition if it exists.

13. The system of claim 12 wherein the data processing subsystem is further configured to communicate with one or more users and to receive access requests for data stored on the storage subsystem, wherein one such access request is a request for the first file.

14. The system of claim 12 further comprising partition identity information, wherein each partition on the storage subsystem is associated with its corresponding partition identity information, the partition identity information including a partition ID, wherein the partition ID uniquely identifies content of a partition, wherein partitions that are identical have the same partition ID,
  wherein the data processing subsystem is further configured to determine whether an accessed partition is corrupt based on its accessed content and on its partition ID.

15. The system of claim 12 wherein each partition on the storage subsystem is associated with a partition ID comprising a hash code component and a group ID component, wherein partitions that have the same hash code value also have the same group ID if they have identical content, wherein the data processing subsystem is further configured to:
  compute a first hash value for an accessed partition; and
  compare the first hash value with the hash code component of the partition ID associate with the accessed partition in order to determine whether the accessed partition is corrupt.

16. A data processing system comprising:
  first means for accessing a partition comprising a file that is stored on a storage subsystem, a partition comprising data from the file, a partition having associated therewith a partition ID that uniquely identifies content of the partition, wherein partitions comprising identical content have the same partition ID;
  second means for determining whether a partition is corrupt;
  third means for identifying a replacement partition from among a plurality of partitions stored on the storage subsystem to replace a corrupt partition, based on a partition ID associated with the corrupt partition and on partition IDs of the plurality of partitions, the corrupt partition being a constituent partition of a target file; and
  fourth means to modify the target file to replace content comprising the corrupt partition with content from a replacement partition.

* * * * *